May 15, 1923.
A. SCHOEL
DOUGHNUT MACHINE ATTACHMENT
Filed Jan. 16, 1922
1,455,174
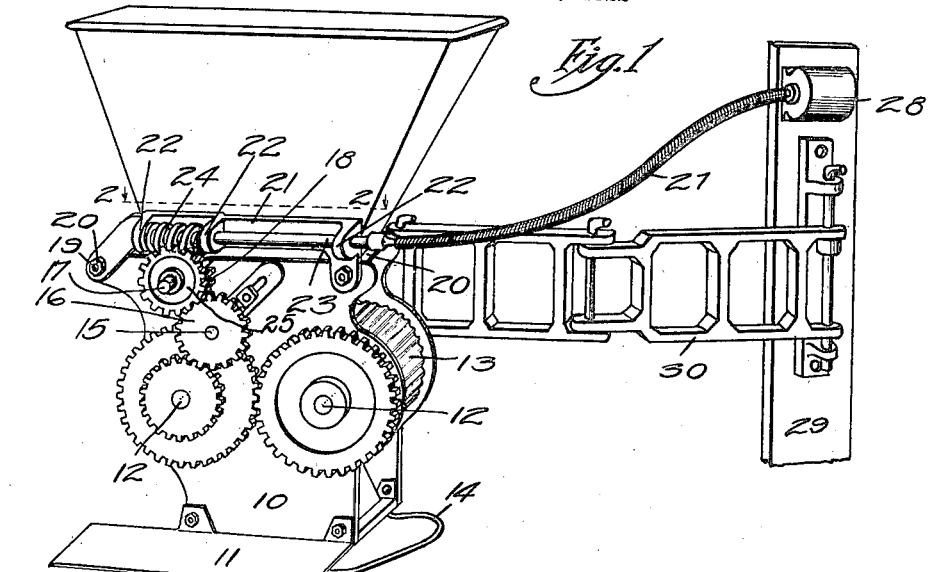
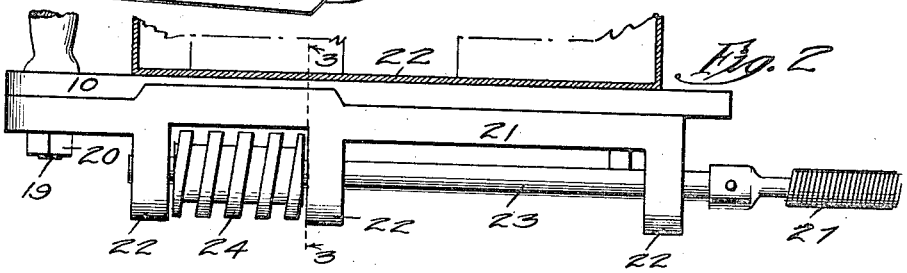
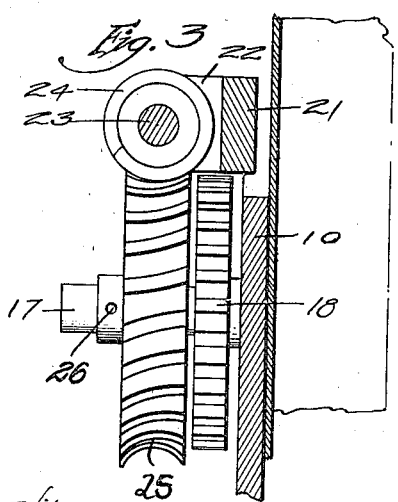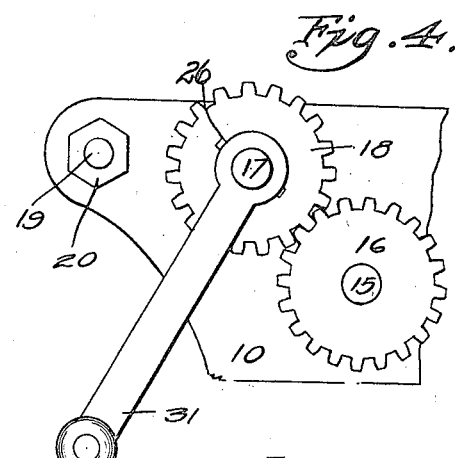
Inventor
August Schoel
By Bair & Freeman —Attys Patented May 15, 1923.

1,455,174

UNITED STATES PATENT OFFICE.

AUGUST SCHOEL, OF WATERLOO, IOWA, ASSIGNOR TO GEORGE SCHOEL, OF WATERLOO, IOWA.

DOUGHNUT-MACHINE ATTACHMENT.

Application filed January 16, 1922. Serial No. 529,535.

*To all whom it may concern:*

Be it known that I, AUGUST SCHOEL, a citizen of the United States, and a resident of Waterloo, in the county of Black Hawk, and State of Iowa, have invented a certain new and useful Doughnut-Machine Attachment, of which the following is a specification.

The object of my invention is to provide a doughnut machine attachment of simple, durable and comparatively inexpensive construction.

More particularly, my invention relates to a driving attachment for doughnut machines of the type illustrated by my Letters Patent, dated June 14, 1921, No. 1,381,850.

Still another object is to provide a doughnut machine driving attachment adapted to be secured to the frame of a doughnut machine and arranged to be operatively connected to the gearings thereof, so that the doughnut machine may be easily operated by power and the parts being so arranged that the attachment may be easily removed from the frame of the doughnut machine and the parts then operated by hand power.

Still another object is to provide a power driving attachment for a doughnut machine arranged to be mounted on a support, the doughnut machine being capable of swinging movement, the motor for driving the doughnut machine being mounted on the support.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of a doughnut machine with my improved drive attachment illustrated thereon.

Figure 2 is a central, sectional view taken on the line 2—2 of Figure 1, showing my drive attachment.

Figure 3 is a sectional view taken on the line 3—3 of Figure 2; and

Figure 4 is a detailed view of one end of the doughnut machine frame, showing the crank for operating the machine by hand.

In the accompanying drawings, I have used the reference numeral 10 to indicate generally the doughnut machine frame, which is provided with a fender 11. The doughnut machine frame has journaled therein a pair of longitudinal shafts 12. A set of coacting gears connect the longitudinal shafts together.

Each of the shafts 12 have mounted thereon corrugated drums 13 for feeding the dough through the die, which is arranged at the lower end of the doughnut machine frame. A cutter 14 is provided, which is operated for cutting the dough from the die for thereby forming the doughnut.

A stud shaft 15 is provided on a sliding bearing and has fixed to it a gear 16. A shaft 17 is journaled in the doughnut machine frame. The shaft 17 has fixed to it a gear 18 in mesh with a gear 16.

From the construction of the parts just described, it will be seen that rotation of the shaft 17 will impart rotation to the shaft 15 and through the gearings to the shafts 12.

Extending through the sides of the doughnut machine frame 10 are the pair of rods 19, which have their ends screw-threaded, and have nuts 20 on their screw-threaded ends.

Resting against one side of the frame 10 and on the rods 19 is an auxiliary frame 21, having the bearing members 22 formed thereon at right angles to the main part of the frame 21. Rotatably mounted within the bearing members 22 is the shaft 23.

Received between a pair of the bearing members 22 and fixed to the shaft 23 is a worm 24. The worm 24 is in mesh with a worm wheel 25 on the shaft 17. The worm wheel 25 is fixed to the shaft 17 by means of a pin 26 extended through the shaft 17. Fixed to one end of the shaft 23 is a flexible shafting 27, which is connected to the motor 28. The motor 28 is fastened to a support 29.

The entire doughnut machine is mounted on a pair of arms 30 pivotally connected together and capable of pivotal movement relative to the support 29.

It is well-known that in doughnut machines, it is necessary to swing the entire machine to various positions. It is therefore extremely necessary to provide the flexible shafting 27.

When it is desired to operate the machine by hand by rotating an ordinary crank, the pin 26 is removed, thereby permitting the worm wheel 25 to be removed. A crank 31 may then be fastened to the shaft 17 by the pin 26.

The gear 18 does not in anyway interfere with the worm 24, so that when the shaft 17, is being operated by the hand crank 31, it is not necessary to remove any of the power driving attachment except the worm wheel 25.

It will be seen that my driving attachment may be entirely removed from the doughnut machine frame by releasing the nuts 20 and removing the entire auxiliary frame 21 from the rods 19.

My device is of very simple construction, and the entire machine can be very quickly changed, so that it may be operated by hand or may be driven by power, as desired.

Some changes may be made in the construction and arrangement of the various parts of my device, without departing from the essential features and purposes of my invention, and it is my intention to cover by my claim, any modified forms of structure or use of mechanical equivalents, which may be reasonably included within its scope.

I claim as my invention:

In a device of the class described, a support, an arm pivoted for swinging movement mounted on said supports, a doughnut cutting and forming machine frame having shafts journalled therein supported on said arm, gearings for operatively connecting the shafts together for driving them, an auxiliary frame having a pair of downwardly extending ears, said ears being provided with openings for mounting it on the frame of the doughnut machine, bearing members projected at right angles to the main body portion of said auxiliary frame, a longitudinal shaft journalled in said bearing members, a worm wheel on one of said first shafts, a worm on said longitudinal shaft in mesh with said worm wheel, a motor on said support and a flexible shaft for operatively connecting the longitudinal with the motor for driving the last shaft.

Des Moines, Iowa, January 4, 1922.

AUGUST SCHOEL.